US009234971B2

(12) United States Patent
Khan et al.

(10) Patent No.: US 9,234,971 B2
(45) Date of Patent: Jan. 12, 2016

(54) DIRECT RESERVOIR SIGNATURE USING THE DRAG WAVE

(71) Applicant: NONLINEAR SEISMIC IMAGING, INC., Cypress, TX (US)

(72) Inventors: Sofia Khan, Cypress, TX (US); Tawassul Ali Khan, Cypress, TX (US)

(73) Assignee: NONLINEAR SEISMIC IMAGING, INC., Cypress, TX (US)

( * ) Notice: Subject to any disclaimer, the term of this patent is extended or adjusted under 35 U.S.C. 154(b) by 0 days.

(21) Appl. No.: 14/082,193

(22) Filed: Nov. 18, 2013

(65) Prior Publication Data

US 2015/0138915 A1    May 21, 2015

(51) Int. Cl.
*G01V 1/00*        (2006.01)

(52) U.S. Cl.
CPC .............. *G01V 1/005* (2013.01); *G01V 1/003* (2013.01)

(58) Field of Classification Search
USPC .......................................................... 367/14
See application file for complete search history.

(56) References Cited

U.S. PATENT DOCUMENTS

| | | | | | |
|---|---|---|---|---|---|
| 4,128,011 | A | * | 12/1978 | Savage | 73/579 |
| 5,986,974 | A | * | 11/1999 | Luo et al. | 367/41 |
| 6,175,536 | B1 | | 1/2001 | Khan | |
| 6,181,646 | B1 | * | 1/2001 | Bouyoucos et al. | 367/189 |
| 6,597,632 | B2 | | 7/2003 | Khan | |
| 6,614,717 | B1 | * | 9/2003 | Khan et al. | 367/46 |
| 6,631,783 | B2 | * | 10/2003 | Khan | 181/108 |
| 6,678,617 | B2 | * | 1/2004 | Khan | 702/16 |
| 6,684,159 | B2 | * | 1/2004 | Khan et al. | 702/16 |
| 6,789,018 | B1 | * | 9/2004 | Khan | 702/2 |
| 6,807,487 | B2 | * | 10/2004 | Khan | 702/16 |
| 6,937,938 | B2 | * | 8/2005 | Sansone | 702/16 |
| 7,447,114 | B2 | * | 11/2008 | DuBose, Jr. | 367/43 |
| 7,720,607 | B2 | * | 5/2010 | Lecerf et al. | 702/11 |
| 7,761,237 | B2 | * | 7/2010 | Dong et al. | 702/17 |
| 2002/0122352 | A1 | * | 9/2002 | Khan | 367/57 |
| 2002/0134612 | A1 | * | 9/2002 | Khan | 181/108 |

(Continued)

OTHER PUBLICATIONS

Biot, M. A., 1956, Theory of propagation of elastic waves in a fluid saturated porous solid: Journal Acoustic Society of America.

(Continued)

*Primary Examiner* — James Hulka
(74) *Attorney, Agent, or Firm* — Norton Rose Fulbright US LLP

(57) ABSTRACT

A monofrequency signal is used to record signature properties of subsurface reservoir formations. While recording conventional Vibroseis data after certain prescribed distances, the monofrequency signal is transmitted to evaluate the presence of reservoir rocks underneath that source location. When a compressional wave travels through a permeable and fluid-saturated reservoir formation, the Drag Wave travels through reservoir fluid interconnections at a slower velocity than the compressional wave in the rock matrix. Due to the Doppler Effect, a unique lower frequency is generated. This lower frequency becomes an indicator of the presence of reservoir formations. Its character depends on the tortuosity of pore interconnections, presence of pore fluids, and permeability. A transfer function is calculated to convert the swept frequency signal used for conventional seismic recording. This converted swept frequency signal is cross-correlated with the normally recorded signal. Only the presence of the reservoir formation is highlighted; non-reservoir formations are not displayed.

6 Claims, 6 Drawing Sheets

(56) References Cited

U.S. PATENT DOCUMENTS

| | | | | |
|---|---|---|---|---|
| 2002/0188407 | A1* | 12/2002 | Khan | 702/16 |
| 2003/0004649 | A1* | 1/2003 | Khan | 702/16 |
| 2003/0125879 | A1* | 7/2003 | Khan et al. | 702/14 |
| 2009/0175125 | A1* | 7/2009 | Khan et al. | 367/43 |
| 2010/0103773 | A1* | 4/2010 | Chiu et al. | 367/41 |
| 2010/0208554 | A1* | 8/2010 | Chiu et al. | 367/153 |
| 2011/0013482 | A1* | 1/2011 | Eick et al. | 367/38 |

OTHER PUBLICATIONS

Donskoy, D.M., Khashanah, K., and McKee, T.G. (1997). "Nonlinear Acoustic Waves in Porous Media in the Context of Biot's Theory ", J.Acoust.Society of America . 102 (5), 2521-.

Johnson, P.A., Rasolofosaon, P.N.J.; Manifestation of Nonlinear Elasticity in Rock: Convincing Evidence Over Large Frequency and Strain Intervals from Laboratory Studies;1995.

Johnson, P.A., Shankland, T.J.; Nonlinear Generation of Elastic Waves in Crystalline Rock; Journal of Geophysical Research. 1987.

Johnson, P.A., McCall, K.R.; Observations and Implications of Nonlinear Elastic Wave Response in Rock; Geophysical Research letters. 1994.

Klimentos, T., McCann, C. 1988, Why is the Biot Slow Compressional Wave not observed in real rocks. Geophysics 53, 1605.

Meegan, G.D., Johnson, P.A.; Observations of Nonlinear Elastic Wave Behaviour in Sandstone; Journal Acoustic Society of America. 1994.

Scheidegger, A. E. 1960, Physics of flow through porous media: University of Toronto; pp. 8,116,120,128-29, 241-45, 258-59.

* cited by examiner

DIRECT RESERVOIR SIGNATURE USING THE DRAG WAVE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

This invention introduces a new concept to directly map the subsurface formations in geophysical or subsurface exploration. This technology can be easily implemented as part of a regular exploration program. Surface seismic vibrators are generally being used as a seismic source for land exploration throughout the world. For most normal seismic operations, a swept frequency signal is transmitted by the surface vibratory units and recorded by multiple detectors located either in some form of 2D or 3D configuration; it is universally practiced and known in the art. For the purpose of introducing the concept of this invention, there is no necessity to describe the conventional swept signal in detail. Also known in the art, the recorded data of the conventional method is cross-correlated with the swept frequency signal that was used as a seismic source to generate the compressional wave transmitted into the earth.

In addition to a swept frequency signal, these surface seismic vibrators can generate a monofrequency signal of any chosen frequency within the conventional seismic bandwidth. In this invention, the monofrequency signal is transmitted on its own, and is added as a separate step at every nth station, to the recording that is used for the known and conventional methods of today.

By transmitting the compressional wave in the form of the monofrequency signal from the source, this unique approach is used to directly record the signature properties of the subsurface reservoir formations whenever the reservoir is present.

Reservoirs that are porous, permeable, and fluid-saturated, display different signal transmission characteristics compared to non-reservoir formations. Since reservoirs are fluid-saturated and provide permeable connections through interconnected pores, then a part of the compressional energy is transferred. The velocity of the compressional wave depends on the rock matrix of the reservoir and also to a certain extent the pore fluids that saturate the formation. The Drag Wave travels at a slower velocity, which is slower than the velocity of the compressional wave in the pore fluid itself.

These two waves, the compressional wave and Drag Wave, both propagate through the reservoir formation simultaneously. Because of the difference in their propagating velocity, a Doppler shift in the primary frequency of the monofrequency takes place. A lower frequency is generated within the reservoir, which may be three to four times lower than the primary frequency of the originally transmitted monofrequency. This lower Drag Wave frequency depends on the tortuosity and permeability of the reservoir rock; the properties of the pore fluids in the rock; and becomes a direct signature of the reservoir formation. The value of the lower Drag Wave frequency generated and its amplitude will depend on the reservoir properties and is going to change according to the permeability of the reservoir formation, the viscosity of the pore fluids, the tortuosity of the reservoir rock, the porosity of the reservoir formation, and other reservoir characteristics (maybe the clay content).

While recording the normal conventional Vibroseis data after certain prescribed distances, we can transmit the monofrequency signal to evaluate the presence or the absence of reservoir rocks underneath that source location. The presence of this lower Drag Wave frequency, is an indicator of the presence of subsurface reservoir rocks. The absence of the lower Drag Wave frequency is also a strong indicator that there are no commercially viable reservoir rocks underneath those locations. In this manner we can identify the potential areas which will be of interest for hydrocarbon exploration, and discard the areas that do not show any potential prospect of finding any reservoir fluids in the subsurface. This simple exploration technology will eliminate drilling unnecessary wells since the absence of the lower Drag Wave frequency also indicates the absence of any fluid-saturated reservoir rocks. There is no limitation on the quantity and variety of monofrequencies that can be transmitted at every nth station.

Another important contribution of this technology is that by recording the lower Drag Wave frequency signal generated by the monofrequency transmitted from the surface, we can calculate a transfer function, or conversion factor. Once we have this ratio between the monofrequency signal and the lower Drag Wave frequency, we can convert the swept frequency signal being used for conventional seismic recording and use it for cross-correlation of the data obtained by the conventional Vibroseis sweep. For instance if the conventional swept frequency signal being used for conventional recording is 15 Hz to 60 Hz, and the transfer function is of 3, then we can generate a sweep of 5 Hz to 20 Hz which will represent the Drag Wave frequency when the normal conventional Vibroseis sweep is transmitted through the reservoir rock. The newly created sweep will be cross-correlated with the conventional data set to obtain an image that will show the extent and location of the reservoir.

This reservoir-generated lower Drag Wave frequency is limited to the reservoir and comes to an abrupt end at the lower interface of the reservoir formation since there is no permeability beyond that point. Due to this abrupt termination at the lower reservoir interface, a strong reflected signal is generated. This strong reflected signal is of the lower Drag Wave frequency related by the transfer function determined while using the monofrequency signal.

Any descriptive teens of equipment used, such as source, vibrator, Vibroseis, and detector are generic names for the devices that are capable of transmitting and measuring a pressure wave or another quantity, and they are known in the art. Thus, a detailed description of these devices is not provided herein.

It should be noted and understood that there can be improvements and modifications made of the present invention described in detail above without departing from the spirit or scope of the invention.

2. Description of Related Art

The seismic subsurface imaging methods of the past few decades use seismic attribute analysis and signal amplitude extraction in the subsurface structural features to map the reservoir characteristics. In spite of recent advances in seismic acquisition and data processing, the results are quite often non-unique and ambiguous. The results fail to identify the extent and location of the fluid-saturated subsurface reservoir formations. The industry needs new technologies to be developed which directly relate to the reservoir properties of interest, rather than the subsurface structure.

The most important reservoir properties that differentiate the reservoir rocks from non-reservoir rocks are porosity, permeability and the identification of the pore fluids. In large exploration programs when the seismic data volume can become very large and overwhelming, the industry needs a simple yet sophisticated method which will identify more promising leads and that will direct the explorationist to focus on the areas which are more likely to be commercially viable. This patent is designed to address that shortcoming by using simple acquisition and data processing methods to locate the subsurface reservoir formations that will provide more commercial and beneficial returns.

Those skilled in the art would understand that current conventional seismic recording involves the use of a swept signal that is generated from a vibratory source. The data recorded using the conventional swept signal is cross-correlated and this recording procedure is known in the art. There is no existing conventional seismic method of utilizing the Drag Wave and directly mapping the location and extent of the subsurface reservoirs. This Drag Wave is a unique signal that is dependent upon the attributes of permeability, porosity, fluid content and tortuosity of the reservoir rock.

In the current conventional seismic exploration recording, the Drag Wave is ignored because the cross-correlation with the conventional Vibroseis sweep acts like a powerful filter and discards all the other signals that are generated. The Drag Wave is ignored because it is outside of the spectrum of the conventional swept frequency signal generated by the seismic vibratory source.

A number of the scientists who have studied nonlinear acoustic wave propagation have performed studies and determined that the possibility exists to use these concepts to further understand the Earth's subsurface, in our case for the purposes of locating the hydrocarbon reservoirs.

Biot (1956) proposed a comprehensive theory that explained many important features of the seismic wave propagation in fluid-saturated porous media. One of the important contributions of his theory is the prediction of a Slow Compressional Wave with a speed lower than that of the rock matrix or the pore fluid. The Slow-Wave involves a coupled motion between the fluid and the solid frame. The Slow-Wave's velocity and attenuation depend on the morphology of the pore space and the pore interconnections, which also determine the reservoir properties such as permeability, porosity and the presence of pore fluids. The detection of the presence of the Slow-Wave or Drag Wave in a reservoir formation will be an indicator of the reservoir rocks.

Donskoy (1997) wrote that "Nonlinear dynamic behavior of porous media, natural or artificial, has attracted increasing attention recently. It has been observed experimentally that porous media, such as soil, rocks, sediments, etc., exhibit a strong elastic nonlinearity, in some cases two to three orders of magnitude greater as compared with nonporous media." He also stated that the nonlinear parameters of the porous media depend on porosity.

Johnson has also suggested that the measurement of the dynamic elastic nonlinearity of the reservoir rocks is a sensitive tool because the porosity induces an orders of magnitude change for the nonlinear coefficients and a few percent change for linear parameters of velocity, attenuation etc. The "nonlinear signal" is important for investigating the nonlinear properties of rocks.

Johnson writes further to state that the ramifications of nonlinear response in rock may ultimately affect many areas of research in geosciences including seismology, where the spectral distortion of seismic waves during propagation must be considered. And, that the primary mechanisms that produce nonlinear response in rock are due to the low-aspect ratio compliant features (cracks, grain-to-grain contacts, etc.)

Klimentos (1988) stated that "Permeability is strongly dependent on pore size but is also a function of the tortuosity of the pores in a rock. Consequently, the properties of the slow wave may be of considerable practical importance in estimating rock permeability in situ."

Meegan (1994) stated that Earth materials are an important example of this type of disordered media because of their practical importance in geophysics and seismology.

Scheidegger (1960) published a book on the physics of flow in porous media, and gives us a better understanding of the significance of the physical aspects of porous, permeable and fluid saturated reservoir rock.

Additionally, the existing U.S. Patents assigned to Nonlinear Seismic Imaging, Inc. and invented by Khan since 2001 when the company was formed, including U.S. Patent Application Publications Nos. 2002/0188407 and 2003/0004649, reflect the understanding of the concepts and its own empirical observations while performing the field evaluations. As a basis for the development of this technology, there were three main attributes that were identified that could be used as a basis of a new effort that have either been ignored or not fully understood by the geophysicists involved in the seismic exploration effort:

1. When a seismic compressional wave propagates through a reservoir formation it generates harmonics of all the primary frequencies that are present in the seismic signal.

2. When there are more than one seismic signals propagating through the reservoir formation simultaneously, the sum and difference frequencies of the two primary waves are created, and that is a unique property of the reservoir formation.

3. During the propagation of the compressional wave through the reservoir formation which is permeable and fluid-saturated, another seismic wave is created which is identified as the Slow Wave or Drag Wave. The Slow Wave travels at a lower velocity than the velocity of the compressional wave in the mineral frame of the rock, or the velocity of the compressional wave in the fluid that saturates that reservoir formation. This phenomenon creates a very low frequency wave that will only be present in the reservoir formation and not in any other subsurface rock.

Nonlinear Seismic Imaging, Inc.'s technology uses these three main characteristics to directly map the presence of hydrocarbons in the subsurface formations. To successfully achieve the desired results, data acquisition has to be specifically designed so that these seismic attributes are created and preserved for further analysis and interpretation after the seismic data have been processed. Without the proper data acquisition, these attributes cannot be usefully extracted during the data processing, and the operator will not get the desired image to identify the presence of hydrocarbons. Nonlinear Seismic Imaging, Inc. previously patented a range of methods for specific and distinctly separate objectives, which can be applied to hydrocarbon exploration and production. These methods include mapping subsurface fractures as described in U.S. Patent Application Publication No. 2003/0004649, mapping the porosity profile as described in U.S. Patent Application Publication No. 2002/0188407, mapping the changes in pore fluids in production stages, and understanding permeable flow units away from the wellbore. The current invention will add to the existing toolbox of solutions for the operators, and will provide a new and unique method to illuminate the subsurface reservoir when incorporating this technique within the conventional recording for the area of interest.

BRIEF SUMMARY OF INVENTION

The present invention defines the concept of directly mapping the presence and the location of the subsurface reservoirs using a discrete, surface-generated monofrequency signal and the Drag Wave. While recording the normal conventional Vibroseis data after certain prescribed distances, a discrete, monofrequency signal is transmitted into the subsurface. As the seismic signal propagates through the reservoir rocks, new frequencies are generated in the form of the Drag Wave. The Drag Wave travels at a much lower velocity than the Compressional Wave. A lower frequency is generated due to the Drag Wave. This signal will not be generated in any rock that does not exhibit porosity, permeability and the presence of pore fluids. Using a conversion factor of the ratio between the monofrequency signal and the lower Drag Wave frequency, a new swept frequency signal is created. The new, swept frequency signal is then cross-correlated with the recorded data from the conventional Vibroseis method. As a result, an image is created that will highlight the extent and location of the reservoir, and all the non-reservoir rocks will be invisible.

At present, seismic surveys are recorded to map the subsurface structural anomalies and decisions are made based on this information. To improve the reliability of the results, further analysis is carried out based on the variations in amplitude and velocities. Seismic data are acquired using surface sources and surface receivers, surface sources and downhole receivers, downhole sources and downhole receivers or any combination of the data acquisition techniques.

This invention relates to the concept of directly measuring the signals generated within the reservoir rock for mapping subsurface reservoir rocks. To improve the economics of hydrocarbon exploration, it is important to know the location and extent of the subsurface reservoir rocks. To drill on a seismic anomaly and find that there are no hydrocarbons is expensive and a waste of exploration effort.

The subsurface reservoirs are of certain characteristics that differentiate them from all other subsurface sedimentary rocks. These differentiating properties are porosity, permeability, and pore fluids. This invention uses these three differentiating properties to generate a seismic signal which is unique and can only be generated in a reservoir rather than any other subsurface formation.

When a compressional wave travels through a reservoir formation which is permeable and fluid-saturated, it generates another wave that can be identified as a Drag Wave. This Drag Wave travels through the reservoir fluid interconnections at a much slower velocity than the velocity of the compressional wave in the rock matrix. Due to the Doppler Effect, a lower frequency is generated with the presence of the subsurface reservoir formation. This newly generated lower-frequency could be as much as three to four times lower than the monofrequency that is used as the input signal for the compressional wave.

One of the main advantages of this new method explained in this patent is that the lower frequency generated within the reservoir due to the Drag Wave is totally unique and cannot be mistaken by the harmonics or the interaction of frequencies. This lower frequency becomes a very reliable indicator of the presence of subsurface reservoir formations.

The character of this lower-frequency signal depends on the reservoir properties, which includes the tortuosity of the pore interconnections, the presence of pore fluids, and permeability. These characteristics differentiate the reservoir rocks from the non-reservoir rocks. The character of the lower-frequency signal shows in the amplitude and frequency, expressed by the changes in amplitude and frequency. This information, which is part of this new signal generated in the reservoir as the signature of the reservoir, is going to be different from one location to the other, based on the reservoir properties.

The concept described in this patent would be extremely useful for reconnaissance work in unexplored, frontier areas of the world and also in those areas where the conventional seismic has been unable to map and locate new reservoirs. This invention will also reduce the cost of drilling dry wells because a simple test using this technology will either confirm or decline the presence of reservoir rocks, thus avoiding drilling any wells where this newly generated lower-frequency signal is not present. This invention will reduce the cost of exploration and improve the success ratio, and can easily be implemented with the current seismic equipment and the current practices using seismic imaging at present.

DETAILED DESCRIPTION OF THE INVENTION

Figure 1:
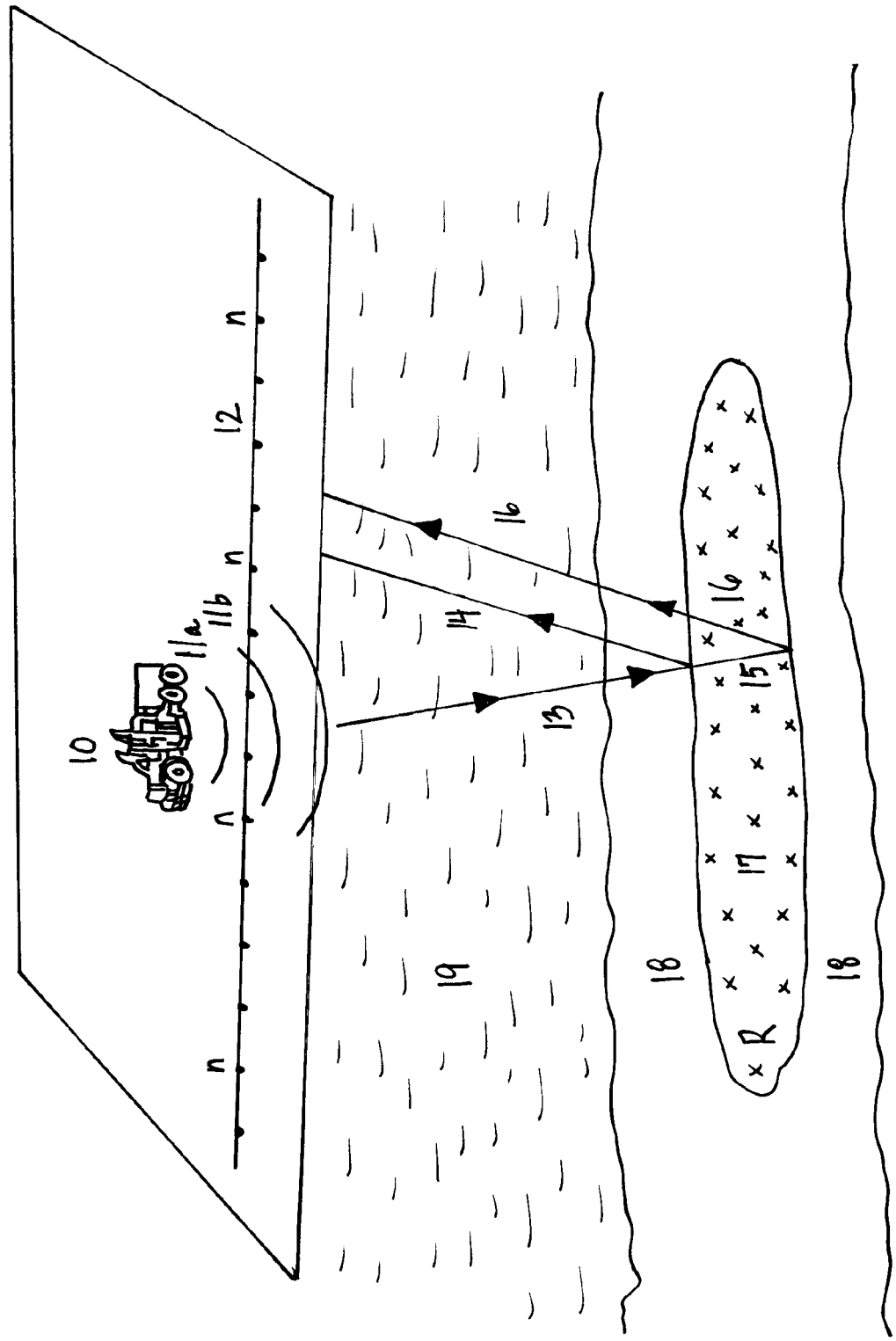
FIG. 1 is a simplified schematic, taken partly in cross section, to illustrate onshore land configurations of the field data acquisition for the invention.

In the drawings, FIG. 1 schematically illustrates the concept of different configurations of land seismic field recording methods for this invention. For the sake of simplifying the concept of this invention, FIG. 1 shows a land data acquisition set-up. These recording procedures are being practiced today and are known in the art. FIG. 1 is a simplified schematic, taken partly in cross section, to illustrate onshore land configurations of the field data acquisition for the invention. FIG. 1 shows a geophone line formation 12 using seismic detectors in a land environment. The surface source 10 is in the form of a Vibroseis truck. In the subsurface, the near surface layer of earth 19 can be characterized as shale rock, and the reservoir rock in the lower subsurface 18 can be characterized as another nonporous, non-reservoir rock. The subsurface reservoir rock 17 is porous, permeable, and contains pore fluids. Porosity, permeability and the presence of pore fluids are the characteristics that are unique to reservoir rocks in the subsurface. Basically FIG. 1 is illustrating that there are many vibratory surface seismic reflection methods currently being used, and this invention is equally applicable to all of them.

The normal production swept frequency 11a is used in FIG. 1, this recording process is common in the industry and is used worldwide and needs no description. In addition, at every nth station n, a chosen monofrequency 11b is used with the normal production sweep 11a but it is independent and transmitted separately. The received reflected seismic signals 14 and 16 are recorded by seismic instruments, which are housed in the recording truck 10. Using the methods described in this invention, for every nth station n the monofrequency 11b is transmitted independently and separately, and recorded at 10.

There is no limitation on the quantity and variety of monofrequencies 11b can be transmitted at every nth station n. For example, transmitting a monofrequency 11b of 40 Hz and another monofrequency 11b of 60 Hz at every nth station n, both monofrequency signals 11b can be transmitted separately and recorded separately. By transmitting various monofrequency signals 11b from the same nth station n, further understanding and comparison of the results can be established.

A vibratory surface source 10 is shown, that generates the seismic signal that penetrates the earth and is reflected from the subsurface acoustic boundaries. The vibrator 10 generates a swept frequency signal 11a that sweeps from 20 Hz to 80 Hz. In practice, any selection of frequencies within the useful seismic bandwidth can be made, and the sweep time can also be adjusted according to the art known in the industry. This data acquisition as shown in FIG. 1 can be done using current available equipment in the industry and the recording methods are well understood and currently in use by the industry.

Additionally, at every nth station, the vibrator 10 generates a separate and independent monofrequency sinusoidal signal 11b of 40 Hz, that is determined according to the desired seismic frequency bandwidth needed to map the target of interest, formation to be mapped, depth of the target, lithology, etc. The time durations of both the monofrequency 11b and swept frequency 11a transmitted signals are identical. Each of the seismic signals 11a and 11b propagate through the subsurface formations, but they are distinctly separate and not transmitted simultaneously.

Surface arrays of seismic detectors, sensors or geophones are shown in FIG. 1 as 12, which can be deployed in a 2-D or 3-D configuration and may be hundreds of independently recorded seismic data channels, spaced in a predetermined geometry according to the practiced art of reflection seismic recording that is well known today. Knowledge of such a deployment of surface seismic detector arrays and wellbore receivers is known in the industry; the equipment is available and the practices of data acquisition and data processing are well known. The seismic recording equipment 10, known in the art, records seismic data from surface detectors 12.

FIG. 1 shows the cross section of the earth, where 17 is a porous reservoir rock formation that may be a sand unit. The sand unit 17 is encased in a non-porous formation 18 that is shale. The shallower rock formation 19 may also be shale. The formations 18 and 19 are sealing formations with little porosity and no permeability. The ray path 13 of the signal 11a and 11b transmitted from 10 propagates through 19 and 18, and is shown by 13. Part of the signal traveling on ray path 13 is reflected from the interface, which is the top of 17, and travels on the reflected signal path 14, and is recorded by the receiver array 12. The remainder of the signal 11a and 11b is transmitted as 15 through the upper interface of 17, travels through the formation 17 and is reflected at the bottom interface of 17, and is transmitted up as a reflected signal 16. The reflected signal 16 travels through the formation 17 and then through 18, then through the shallower formation 19. The signal 16, which represents the reflected signal from the lower interface of 17, is recorded by the surface array 12. The surface array 12 records the presence of this lower Drag Wave frequency which is an indicator of the presence of subsurface reservoir rocks; and the absence of the lower Drag Wave frequency is also a strong indicator that there are no commercially viable reservoir rocks underneath those locations.

Figure 2:
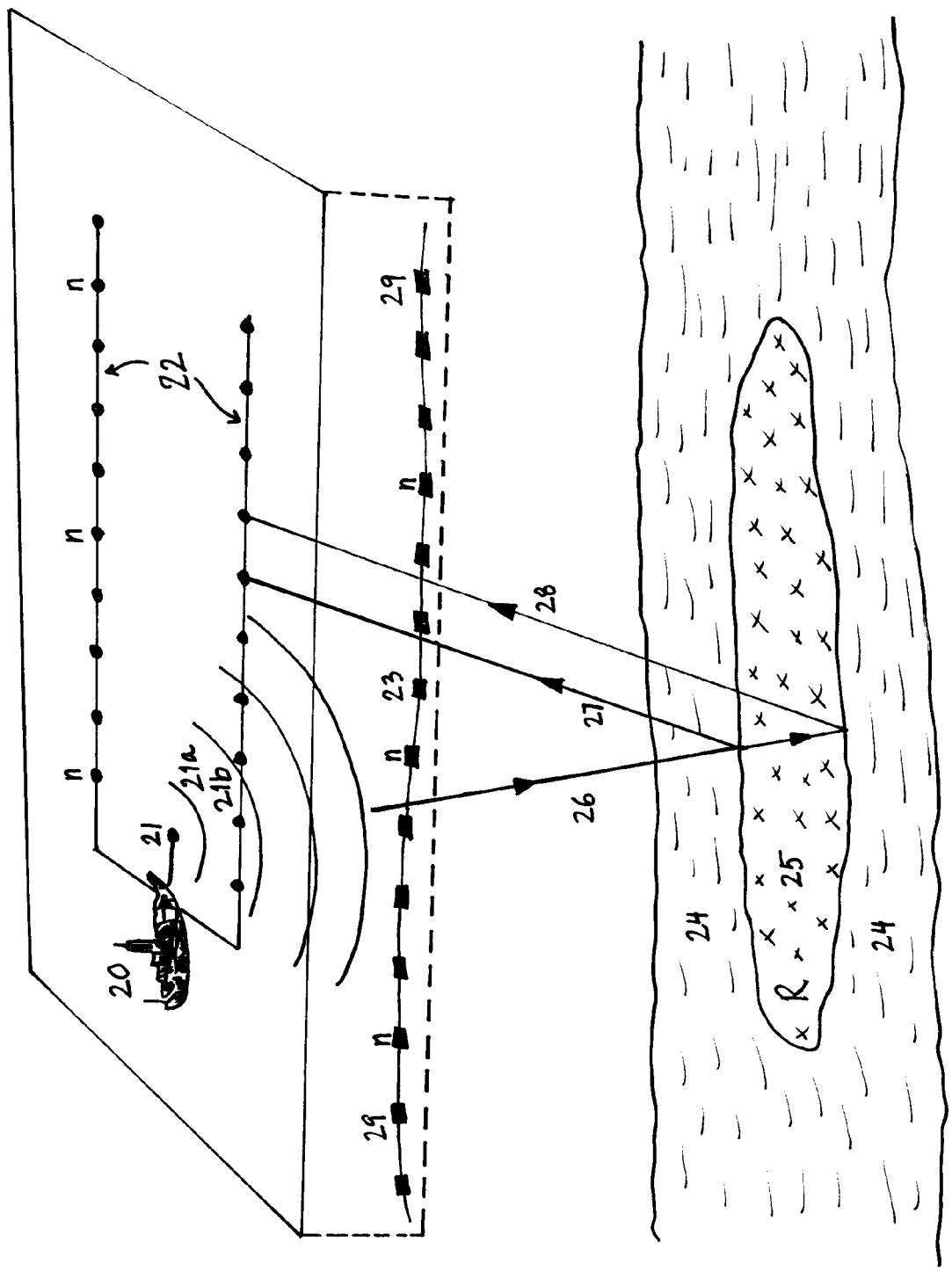
FIG. 2 is another version of a simplified schematic, which illustrates the offshore marine configurations of the field data acquisition for the invention.

The same type of data acquisition can be carried out using marine vibratory sources. These recording procedures are being practiced today and are known in the art. In FIG. 2, which illustrates the offshore marine configurations of the field data acquisition for the invention, it should be clearly understood that the apparatus and methods depicted in the accompanying drawings and referred to in the foregoing description are illustrative only and are not intended as limitations on the scope of the invention. This concept of the direct reservoir signature applies to the marine Vibroseis. Those who are familiar with current recording procedures will be able to use this concept and design the survey as desired, including the concept described within this invention.

FIG. 2 schematically illustrates the concept of different configurations of offshore seismic field recording methods for this invention. In FIG. 2, 20 is a marine seismic vessel, equipped with marine seismic source 21 towing a number of streamers 22, which are equipped with sensors to record seismic reflected signals. In addition to using towed streamers, the industry also uses ocean-bottom cables or ocean bottom nodes to record the seismic reflections like shown as 23. The ocean-bottom cable or ocean bottom node system 23 is laid out at the ocean bottom 29 and is not towed like the streamer 22. Using the method described in this invention, the normal swept production signal 21a is generated from the source 20, and in addition a monofrequency 21b is separately generated and recorded. Again, there is no limitation on how many different monofrequencies 21b can be transmitted at every nth station n. Each of the monofrequencies is transmitted separately and independently. The monofrequency is not transmitted simultaneously with any of the conventionally swept production signals. In the subsurface, 24 can be characterized as a nonporous, non-reservoir rock. The subsurface reservoir rock 25 is porous, permeable, and contains pore fluids. The normal production swept frequency 21a is used in FIG. 2. Using the methods described in this invention, for every nth station n the monofrequency 21b is transmitted independently and separately, and its reflection information recorded at 20. The received seismic reflection data 27 and 28 are recorded by seismic instruments, which are housed in the recording vessel 20.

Each of the seismic signals 21a and 21b, are intended to be transmitted independently and will propagate separately through the subsurface formations. The ray path 26 of the signal 21a and 21b, each transmitted on its own, transmitted from 21 propagates through 24, and is shown by 26. Part of the signal traveling on ray path 26 is reflected from the interface, which is the top of 25, and travels on the reflected signal path 27, and is recorded by the receiver array 22. The remainder of the signal 21a and 21b is reflected at the bottom interface of 25, and is transmitted up as a reflected signal 28. The reflected signal 28 travels through the formation 25 and then through 24. The signal 28, which represents the reflected signal from the lower interface of 25, is recorded by the surface array 22. Each of the monofrequencies and swept signals is recorded separately and independently.

Figure 3:
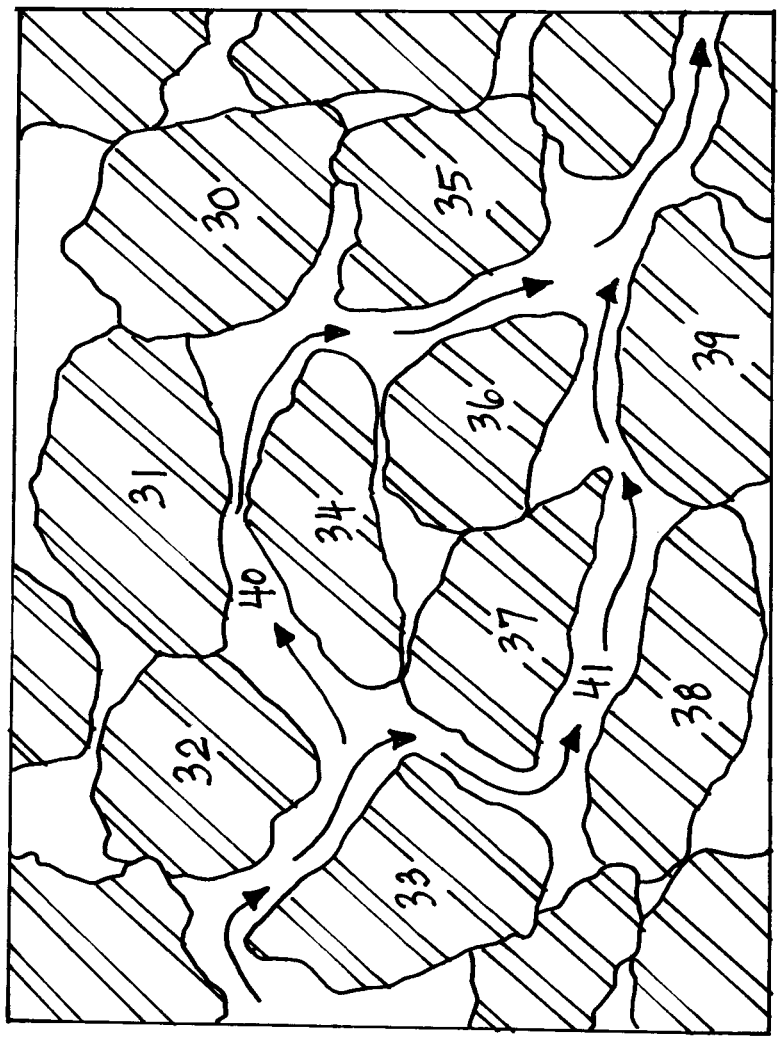
FIG. 3 is a magnified illustration of the tortuous path of the fluid interconnections in a permeable and porous reservoir rock.

FIG. 3 shows a simple illustration of a porous, permeable and fluid saturated rock. It shows a disordered arrangement of mineral grains that form the rock matrix, and the pore space between them, which is fluid-saturated. FIG. 3 is a magnified illustration of the tortuous path of the pore interconnections in a permeable and porous reservoir rock. Due to the porosity of reservoir formation, there are mineral grains and pore fluids.

FIG. 3 also shows 40 and 41 as interconnected pores. The pore fluids are in communication through these tortuous paths. Part of the energy of a seismic compressional wave travels through the rock matrix mineral grains, 30 to 39, and part of the energy travels through the pore fluid connections 40 and 41. In this invention, energy traveling through the pore fluids is called the Drag Wave. The velocity of the Drag Wave is essentially the velocity of the pore fluid but through a tortuous path as shown by 40 and 41. The Drag Wave is a lower frequency generated in the reservoir rock.

Figure 4:
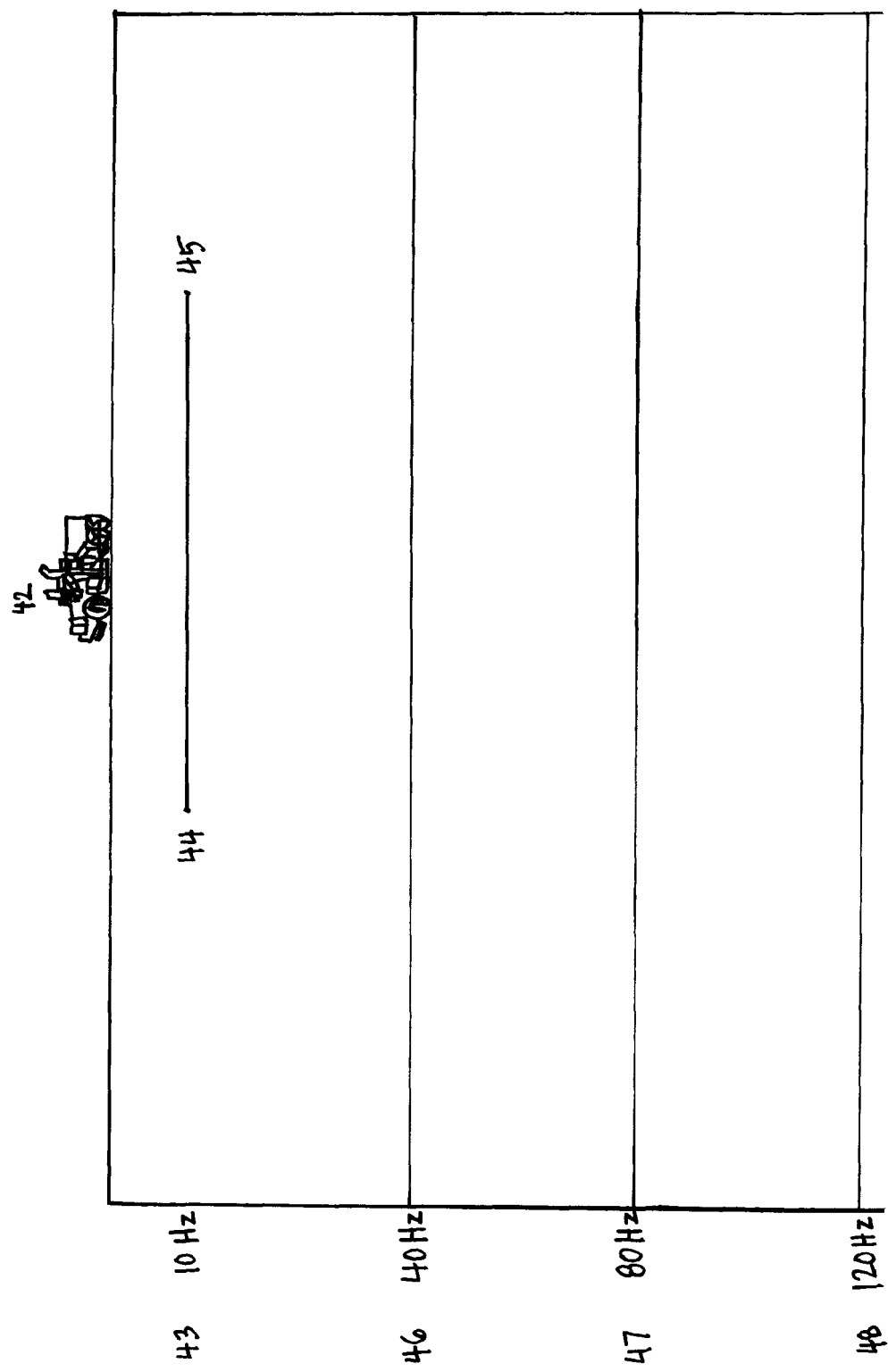
FIG. 4 illustrates the frequency domain of a monofrequency signal being transmitted from the surface.

FIG. 4 illustrates the frequency domain of a monofrequency signal being transmitted from the surface. A Vibroseis truck 42 which acts like the source generates a short duration monofrequency signal, for example a primary wave frequency of 40 Hz. A lower Drag Wave frequency is generated 43 which may be three to four times lower than the primary frequency 46 of the originally transmitted monofrequency. This lower Drag Wave frequency 43 becomes a signature of the reservoir formation. The value of the lower Drag Wave frequency 43 is going to change according to the permeability of the reservoir formation, the viscosity of the pore fluids, the tortuosity of the reservoir rock, the porosity of the reservoir formation, and other reservoir characteristics (maybe the clay content).

In FIG. 4, on a seismic reflection image, because of the Doppler shift, the frequency gets altered and the generated Drag Wave will be visible, from 44 to 45, when the presence of the reservoir exists. The presence of the lower Drag Wave frequency 43 will indicate the presence of the fluid-saturated, porous and permeable reservoir rock. Looking at the recorded results in the frequency domain, the corresponding example of the 10 Hz Drag Wave frequency 43 will only be generated where a porous, permeable and fluid-saturated reservoir is present, from 44 to 45. This signal will not be generated in any rock that does not exhibit porosity, permeability and the presence of pore fluids. The 40 Hz 46 is the recorded reflected signal of the 40 Hz monofrequency. The 80 Hz 47 is the second harmonic of the monofrequency, and 120 Hz 48 is the third harmonic of the monofrequency.

Figure 5:
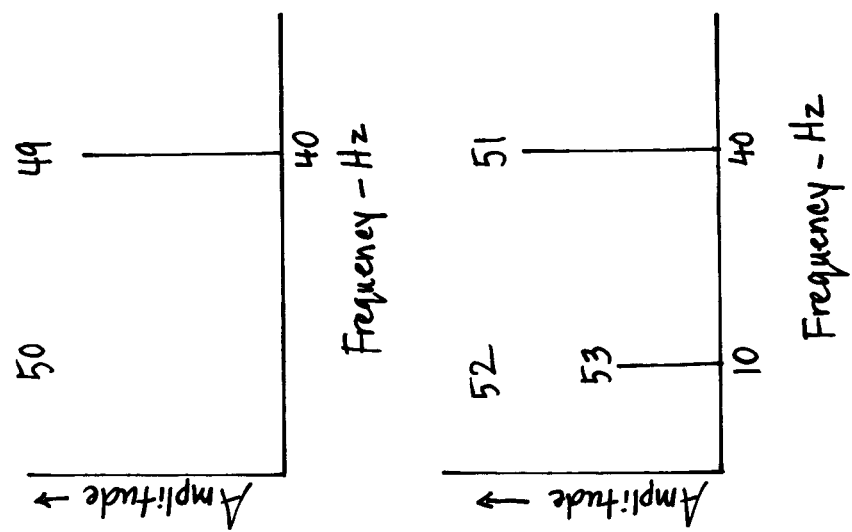
FIG. 5 is a simple illustration showing the frequency and amplitude using the transfer function or conversion factor of the monofrequency signal which is the ratio of the primary frequency to the Drag Wave frequency.

FIG. 5 is a simple illustration showing the frequency and amplitude using the transfer function or conversion factor of the monofrequency signal which is the ratio of the primary frequency to the lower Drag Wave frequency. For example, the input signal is a monofrequency of 40 Hz 49, previously shown in FIG. 4. This is the primary frequency 49. The second graph illustrates the frequency and amplitude of the 40 Hz primary frequency 51 and the presence of the 10 Hz lower Drag Wave frequency 52. The 10 Hz 52 is the lower Drag Wave frequency. This lower-frequency as shown by 52, is unique to the fluid-saturated reservoir rocks since it is generated in the reservoir rock itself. The ratio of the primary frequency 51 to the lower Drag Wave frequency 52 provides the transfer function or conversion factor which is 4:1 in this example.

The presence of the lower Drag Wave frequency 52 in the reflected signal from a particular subsurface rock formation, is a strong indicator that the formation is a reservoir. In the absence of the lower Drag Wave frequency 50, the opposite will be determined, that in fact the formation is not a reservoir. The lower Drag Wave frequency is there when the reservoir is present 52, and the lower Drag Wave frequency is not there when there is no reservoir 50.

Figure 6:
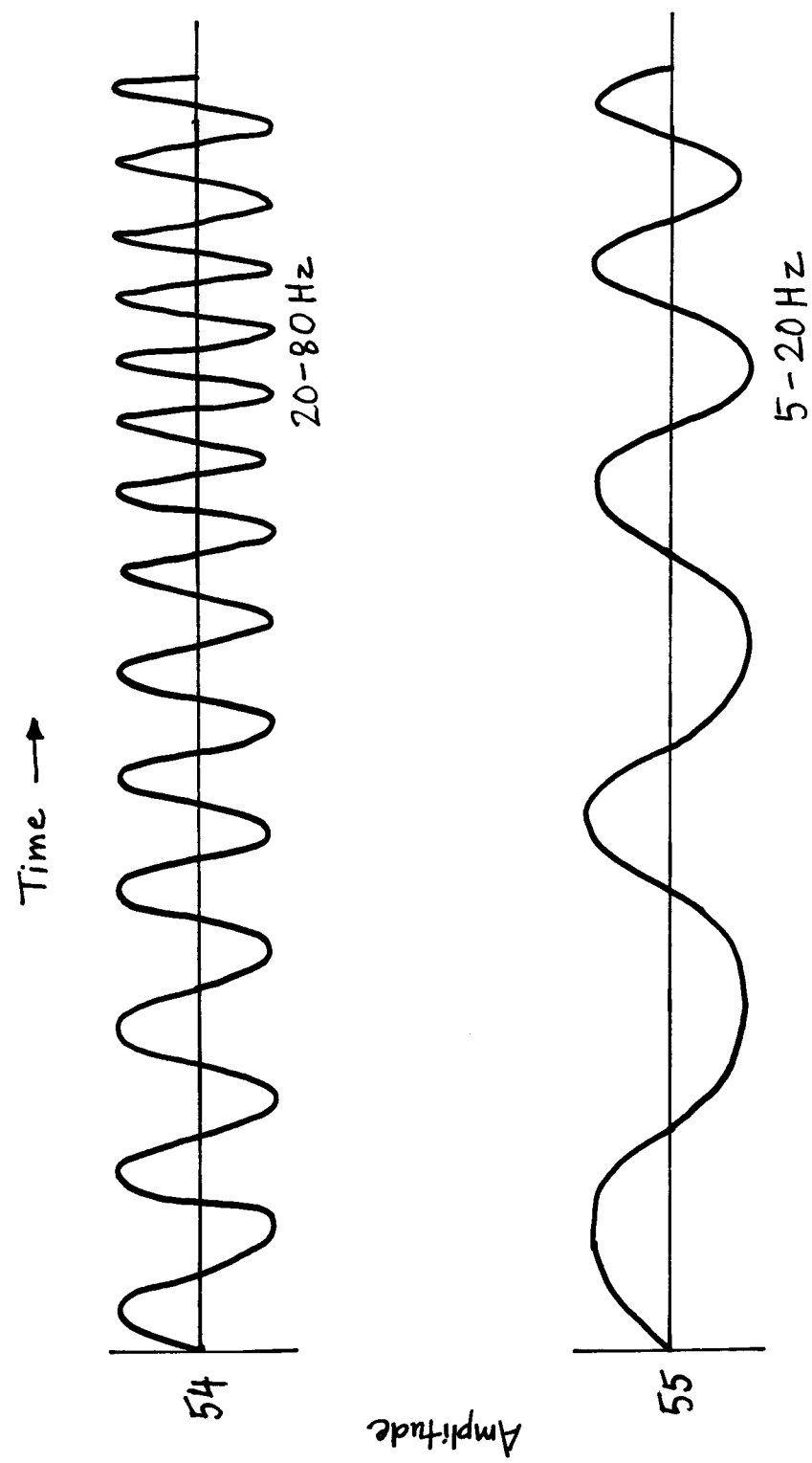
FIG. 6 is a schematic of the swept seismic signal and its conversion using the transfer function or conversion factor to generate the Drag Wave frequency.

FIG. 6 is a schematic of the normal production swept seismic signal and its conversion using the transfer function or conversion factor, to generate a new swept signal. Once the monofrequency signal is transmitted and the Drag Wave frequency is determined, and the transfer function or conversion factor is provided, any sweep can be taken and converted. Once the sweep is converted, it is used to cross-correlate with the normal production Vibroseis data and the results are processed using the same parameters that were used to process the normal production recording data.

The example of using a monofrequency primary signal, 40 Hz, and the Drag Wave frequency, 10 Hz, provides the transfer function of 4:1. Further the normal swept seismic signal is 20 to 80 Hz in this example 54, this could be any combination of frequencies, the selection of such frequencies is known in the art. This is Vibroseis sweep for normal seismic operations, and is also known as the production sweep. This recording process is common in the industry and is used worldwide and needs no description. Using the transfer function of 4:1, this sweep can be converted to 5 to 20 Hz 55. This resulting frequency 55 is used to cross-correlate with the reflection information that was generated using the Vibroseis sweep of 20 to 80 Hz. With this method, we do not lose anything we had before; we will still obtain the conventional data set that is similar to that being used universally, for 2-D and 3-D seismic reflection recording, the methods of data acquisition and data processing are well known in the art. The same data, when cross-correlated with 55 and then processed using the same parameters that were used to process the production data, represents the additional new information and image that has been generated due to the presence of the Drag Wave that is only present and is generated in the reservoir formation.

It should be clearly understood that the equipment and methods in the accompanying drawings and referred to within the description are illustrative only and are not intended as limitations on the scope of this invention. Any skilled person in the art, related to the introduced concept, may carry out modifications not described in the preferred embodiment, to apply these modifications to a determined structure, or in the manufacturing process of the same, requires the claimed matter in the following claims; such structures shall be covered within the scope of the invention.

The patentable scope of the subject matter is defined by the claims, and may include other examples that occur to those skilled in the art. Such other examples are intended to be within the scope of the claims.

Having described the invention above, various modifications of the techniques, procedure, material and equipment will be apparent to those in the art. It is intended that all such variations within the scope and spirit of the appended claims be embraced thereby.

CONCLUSION

A new seismic acquisition method of determining and directly mapping the presence, location and extent of the reservoir formations, highlighting their presence in a separate image by transmitting a monofrequency and obtaining the unique signal generated from within the reservoir itself, using a conversion factor to cross-correlate a new swept signal with the normal recorded data, and observing the signature of each reservoir, comprising the steps of: using reflection seismic recording methods with frequency-generating source, that transmits a short duration seismic compressional wave; transmitting a normal Vibroseis sweep, also known as a production sweep, transmitted from the source location into the earth; this invention is characterized by the unique step of transmitting a separate monofrequency signal, also called the primary signal, from the source location into the earth at every nth station, with no limitation on the quantity and variety of monofrequencies transmitted at each of the nth stations; characterized by transmitting each of the signals separately into the earth and not simultaneously; characterized by synchronizing the normal Vibroseis sweep signal and the monofrequency signal with respect to the duration-time of the signal; determining the presence of the lower Drag Wave frequency from the seismic reflection data transmitted by the monofrequency signal, and that the absence of the lower Drag Wave frequency means that the reservoir is also absent; calculating the transfer function, or conversion factor, which is the ratio between the primary frequency and the Drag Wave frequency;

applying the transfer function or conversion factor to the normal Vibroseis sweep signal, which results in the converted sweep; performing the cross-correlation of the converted sweep with the seismic reflected information that was acquired using the normal Vibroseis sweep signal, to provide the primary set of reflection data; in this manner recording a new primary set of reflection data that has new frequencies, which are generated due to presence of the Drag Wave during its propagation through the subsurface reservoir formations.

REFERENCES CITED

Biot, M. A., 1956, Theory of propagation of elastic waves in a fluid saturated porous solid: Journal Acoustic Society of America.

Donskoy, D. M., 1987, Nonlinear acoustic waves in porous media in the context of Biot's theory. Journal Acoustic Society of America.

Johnson, P. A., Rasolofosaon, P. N. J.; Manifestation of Nonlinear Elasticity in Rock: Convincing Evidence Over Large Frequency and Strain Intervals from Laboratory Studies; Nonlinear Processes in Geophysics.

Johnson, P. A., Shankland, T. J.; Nonlinear Generation of Elastic Waves in Crystalline Rock; Journal of Geophysical Research.

Johnson, P. A., McCall, K. R.; Observations and Implications of Nonlinear Elastic Wave Response in Rock; Geophysical Research letters.

Klimentos, T., McCann, C. 1988, Why is the Biot Slow Compressional Wave not observed in real rocks. Geophysics 53, 1605.

Meegan, G. D., Johnson, P. A.; Observations of Nonlinear Elastic Wave Behaviour in Sandstone; Journal Acoustic Society of America.

Scheidegger, A. E. 1960, Physics of flow through porous media: University of Toronto.

| U.S. Patent Documents | | | |
|---|---|---|---|
| 6,175,536 | January, 2001 | Khan | 367/32. |
| 6,789,018 | September, 2004 | Khan | 702/2 |
| 6,807,487 | October, 2004 | Khan | 367/905 |

The invention claimed is:

1. A method, comprising:
   transmitting, from a first seismic source, a swept wave into a subterranean reservoir at a first time;
   receiving, at a seismic sensor, a first return seismic signal in response to the swept wave;
   transmitting, from a second seismic source comprising an array of seismic stations, a monofrequency signal into the subterranean reservoir at a second time different from the first time;
   receiving, at the seismic sensor, a second return seismic signal in response to the monofrequency signal;
   detecting, in the second return seismic signal, a Drag Wave frequency corresponding to elastic nonlinear interactions of the monofrequency signal propagating through the subterranean reservoir;
   calculating a ratio between the monofrequency signal and the Drag Wave frequency;
   generating a synthetic signal by converting the swept wave using a transfer function based, at least in part, on the calculated ratio between the monofrequency signal and the Drag Wave frequency;
   correlating the synthetic signal and the first return seismic signal to obtain an image of the extent and location of the subterranean reservoir; and
   determining a presence of fluid in the image of the extent and location of the subterranean reservoir from the elastic nonlinear interactions of the monofrequency signal propagating through the subterranean reservoir based, at least in part, on a result of correlating the synthetic signal and the first return seismic signal.

2. The method of claim 1, wherein the step of transmitting the monofrequency signal comprises transmitting from every nth station of the array of seismic stations.

3. The method of claim 1, wherein the step of transmitting the swept wave comprises transmitting the swept wave for a first duration of time, and wherein the step of transmitting the monofrequency signal comprises transmitting the monofrequency signal for the same first duration of time.

4. The method of claim 1, further comprising transmitting, from the second surface seismic source comprising an array of seismic stations, a second monofrequency signal into the subterranean reservoir at a third time.

5. The method of claim 4, wherein the step of transmitting the monofrequency signal comprises transmitting from every nth station of the array of seismic stations, and wherein the second monofrequency signal is transmitted from the same every nth station of the array of seismic stations.

6. The method of claim 1, wherein the first seismic sensor and the second seismic sensor are marine sensors.

* * * * *